United States Patent
Bretschneider et al.

(10) Patent No.: US 7,988,606 B2
(45) Date of Patent: Aug. 2, 2011

(54) MACHINE COMPRISING A MECHANICAL GUIDE ELEMENT FOR GUIDING THE DISPLACEMENT OF A FIRST AND A SECOND DEVICE

(75) Inventors: Jochen Bretschneider, Esslingen (DE); Maximilian Klaus, Stuttgart (DE)

(73) Assignee: Siemens Aktiengesellschaft, München (DE)

( * ) Notice: Subject to any disclaimer, the term of this patent is extended or adjusted under 35 U.S.C. 154(b) by 579 days.

(21) Appl. No.: 12/095,588

(22) PCT Filed: Nov. 8, 2006

(86) PCT No.: PCT/EP2006/068237
§ 371 (c)(1),
(2), (4) Date: May 30, 2008

(87) PCT Pub. No.: WO2007/062966
PCT Pub. Date: Jun. 7, 2007

(65) Prior Publication Data
US 2010/0167888 A1 Jul. 1, 2010

(30) Foreign Application Priority Data
Nov. 30, 2005 (DE) .................... 10 2005 057 174

(51) Int. Cl.
*B23Q 3/157* (2006.01)
(52) U.S. Cl. ................ 483/46; 483/49; 483/51

(58) Field of Classification Search .............. 483/14, 483/15, 16, 44, 46, 49, 51, 36, 38, 39, 40, 483/41, 48, 52, 53, 30; 310/12.01, 12.31, 310/17; 318/135; 409/235; 29/27 C, 36, 29/564, 564.1, 564.7, 430, 783, 791
See application file for complete search history.

(56) References Cited

U.S. PATENT DOCUMENTS

| | | | | |
|---|---|---|---|---|
| 4,599,786 A | * | 7/1986 | Uhtenwoldt | 483/14 |
| 4,909,683 A | * | 3/1990 | Kopidlowski et al. | 409/218 |
| 5,496,249 A | * | 3/1996 | Buggle et al. | 483/41 |
| 6,337,464 B1 | * | 1/2002 | Takaoka et al. | 219/121.78 |

FOREIGN PATENT DOCUMENTS

| | | |
|---|---|---|
| DE | 195 10 498 A1 | 9/1996 |
| DE | 195 21 846 A1 | 12/1996 |
| DE | 101 22 658 C2 | 5/2003 |
| GB | 2 082 484 A | 3/1982 |

* cited by examiner

*Primary Examiner* — Erica E Cadugan
*Assistant Examiner* — Matthew Beisel
(74) *Attorney, Agent, or Firm* — Henry M. Feiereisen; Ursula B. Day

(57) ABSTRACT

The invention relates to a machine comprising a mechanical guide element (2a, 2b) for guiding the displacement of a first (3a, 3b) and a second device (4a, 4b). The machine comprises a first drive device (5a, 5b, 10a) for displacing the first device (3a, 3b) along the guide element (2a, 2b), and a second drive device (6a, 6b, 10b) for displacing the second device (4a, 4b) along the same guide element (2a, 2b) as the first device (3a, 3b). The mechanical construction of a machine is simplified due to said invention.

4 Claims, 1 Drawing Sheet

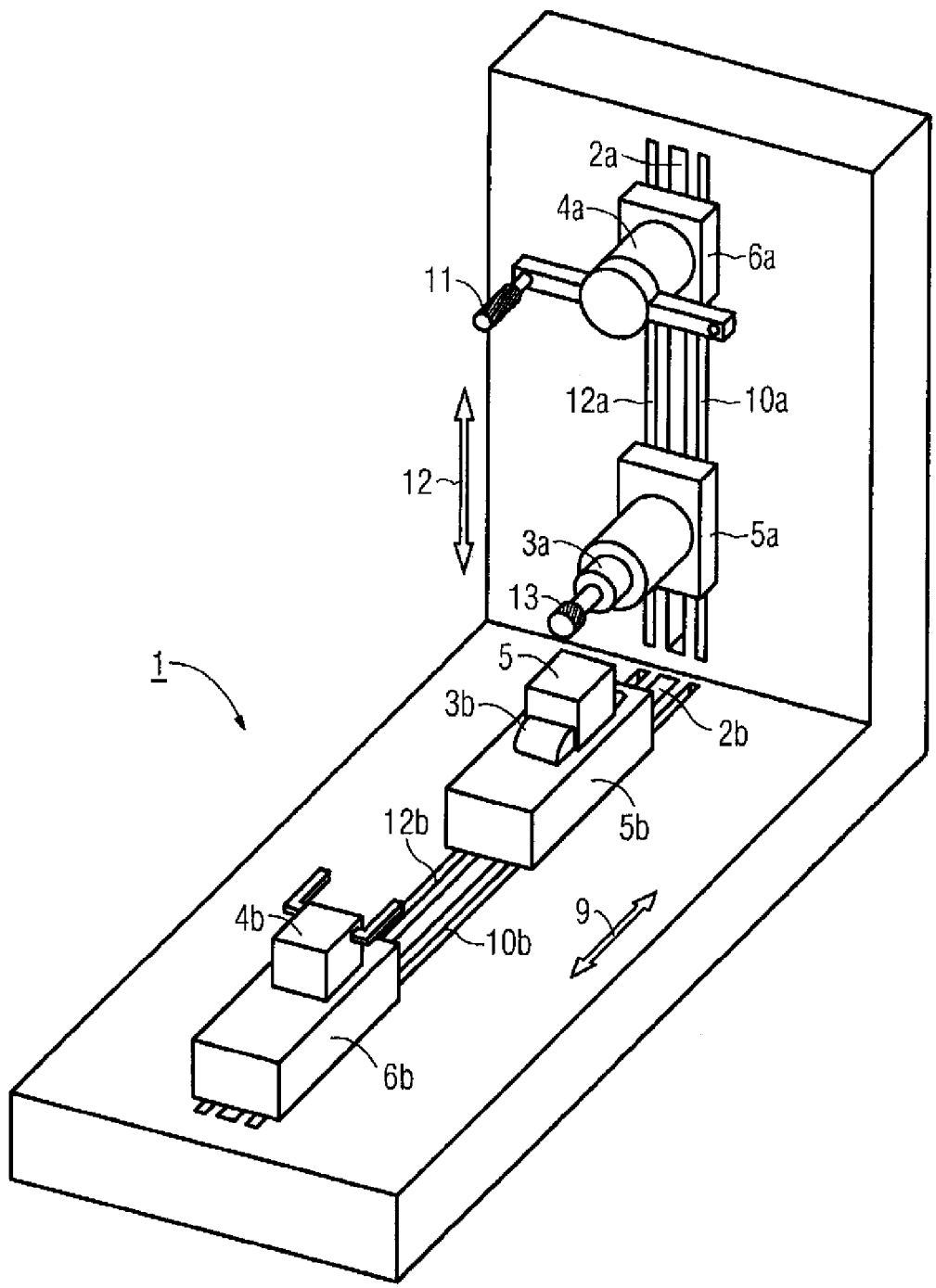

MACHINE COMPRISING A MECHANICAL GUIDE ELEMENT FOR GUIDING THE DISPLACEMENT OF A FIRST AND A SECOND DEVICE

BACKGROUND OF THE INVENTION

The invention relates to a machine comprising a mechanical guide element.

In the case of machines such as e.g. machine tools, production machines and/or robots, each machine axle has a mechanical guide element for guiding the displacement of a single device such as e.g. a tool spindle or a workpiece holding device along the guide element. It is customary during machining e.g. of a workpiece that the tool spindle and/or the workpiece holding device is/are displaced by means of a respectively assigned drive apparatus. As well as these so-called NC (Numerical Control) guided machine axles, customary machines also possess so-called PLC (Programmable Logic Control) guided machine axles which enable the displacement e.g. of a tool changing device (tool changer). Should a tool be changed for a new machining process, e.g. from milling machining to boring machining, it is then customary that the milling cutter is first stopped and the tool spindle which drives the milling cutter is displaced along the guide element to a position at which a tool changing device can perform the tool change. However, this position is often relatively far from the actual position at which the milling machining takes place such that a relatively long time is required for the displacement of the tool spindle and thus the production process must be stopped for a longer time.

Moreover, in customary machines, the tool changing device folds from an idle position for changing the tool. In this case, the displacement process of the tool changing device is guided on a different guide element from the guide element of the tool spindle. This solution is mechanically relatively complex.

SUMMARY OF THE INVENTION

The object of the invention is to simplify the mechanical construction of a machine.

This object is achieved by a machine comprising a mechanical guide element for guiding the displacement of a first and a second device, characterized in that the machine has,
 a first drive apparatus for displacing the first device along the guide element, and
 a second drive apparatus for displacing the second device along the same guide element as the first device.

Advantageous embodiments of the invention will become apparent from the dependent claims.

It has proved to be advantageous if the first drive apparatus and the second drive apparatus are embodied as linear motors. Linear motors represent drive apparatuses which are conventional in the case of machines.

In this context, it has proved to be advantageous if a displaceable primary part of the first drive apparatus and a displaceable primary part of the second drive apparatus use a shared stationary secondary part as a reaction part. If both the primary part of the first linear motor and the primary part of the second linear motor use a shared fixed secondary part as a reaction part, a further, normally essential, second reaction part can be omitted.

It has furthermore proved to be advantageous if the first device is embodied as a tool spindle or as a workpiece holding device. An embodiment of the first device as a tool spindle or as a workpiece holding device represents a conventional embodiment.

Moreover, it has proved to be advantageous if the second device is embodied as a tool changing device or as a workpiece transport device. An embodiment of the second device as a tool changing device or as a workpiece transport device represents a conventional embodiment.

It has furthermore proved to be advantageous if the detection of the position of the first and the second device is performed by means of a scale jointly used by the first and the second device. The use of a second scale can be omitted as a result of this measure.

It has moreover proved to be advantageous if the machine is embodied as a machine tool, production machine and/or as a robot. However, the invention can naturally also be used in other types of machines.

BRIEF DESCRIPTON OF THE DRAWING

Two exemplary embodiments of the invention are shown in the drawing and are explained in greater detail below. Therein:

FIG. 1 shows a machine according to the invention.

DETAILED DESCRIPTION OF PREFERRED EMBODIMENTS

In FIG. 1, a machine 1 is represented in the form of a schematic view, which machine 1 is embodied in the context of the exemplary embodiment as a machine tool. The machine has a first device 3a which is embodied in the context of the exemplary embodiment as a tool spindle. The tool spindle drives a tool 13 in a rotary manner, which tool 13 is embodied in the context of the exemplary embodiment as a milling cutter. A workpiece 5 is machined with the help of tool 13. The machine furthermore has a second device 4a which is embodied in the context of the exemplary embodiment as a tool changing device. The milling cutter can be replaced e.g. with a borer 11 with the help of the tool changing device and thus boring machining can be performed.

According to the invention, the machine has a mechanical guide element 2a for guiding the displacement of first device 3a and second device 4a. In this case, the displacement, in the context of the exemplary embodiment, is performed in the form of a vertical displacement in the direction of arrow 12. The displacement of second device 4a thus takes place along the same guide element as the displacement of first device 3a. Both devices 3a and 4a thus use a shared guide element 2a. First device 3a is displaced along guide element 3a with the help of a first drive apparatus. Second device 4a is displaced along the same guide element 2a with the help of a second drive apparatus. In this case, the first drive apparatus and the second drive apparatus can conventionally be embodied with the help of rotary motors which displace the respectively assigned device via ball caster spindles. The machine thus no longer has a separate guide element for second device 4a, i.e. for the tool changing device, i.e. only one shared guide element 2a is present for the tool spindle and the tool changing device. This leads to a significant reduction in the design complexity since the tool changing device is no longer realized in the form of a separate machine axle. Moreover, the tool changing device can be moved close to the machining process for replacement of tool 13 and the tool change is performed close to the machining process. It is thus no longer necessary that the tool spindle has first to be moved into a position remote from the operational process for the tool change.

In the exemplary embodiment, the first drive apparatus and the second drive apparatus are advantageously embodied as linear motors. To this end, first device 3a is connected to displaceable primary part 5a of the first drive apparatus. Primary part 5a forms, together with stationary secondary part 10a, which is used as a reaction part, a first linear motor. Primary part 6a of the second drive apparatus forms, together with the same secondary part 10a, a second linear motor. First device 3a is connected to primary part 5a of the first drive apparatus and second device 4a is connected to primary part 6a of the second drive apparatus. Primary part 5a and primary part 6a thus use only one shared stationary secondary part as a reaction part, which has the advantage that the mechanical design can be yet further simplified by adjusting the construction lengths of primary parts 5a and 6a and the electric coils of the primary parts correspondingly to the required performance. As a result, the drive force and the power requirement of the drives can be optimized. An optimum thermal utilization of the linear motors can be achieved with the help of suitable overload or constant load primary parts.

The detection of the position of the first and second device is performed in this case by means of a scale 12a jointly used by first and second device 3a and 4a, which scale 12a is arranged along guide element 2a. Only a single scale is thus also required for determining the position of first device 3a and second device 4a, which further reduces the design complexity.

A second embodiment of the invention is furthermore shown in FIG. 1. As well as guide element 2a already described which runs vertically, the machine also has a guide element 2b running in the horizontal direction (see arrow 9), which guide 2b is realized in the context of the exemplary embodiment as a V-shaped groove. In the context of this embodiment of the invention, the first device is embodied as a workpiece holding device 3b in which workpiece 5 is clamped and which is displaced by means of primary part 5b of a first drive apparatus along guide element 2b. Primary part 5b forms, together with a secondary part 10b, which is used as a reaction part, a linear motor. With the help of a second drive apparatus, which is present in the context of this embodiment of the invention, in the form of primary part 6b, a second device 4b, which is present in the context of this embodiment of the invention and which is embodied as a tool transport device, is displaced along guide element 2b. Primary part 6b forms, together with secondary part 10b, a linear motor. Both primary parts 5b and 6b thus again use a shared secondary part 10b as a reaction part.

With the help of the invention, workpiece holding device 3b no longer has to be moved from the operational process along guide element 2b for a change to workpiece 5, but rather workpiece transport device 4b can transport a workpiece 5 to be machined to the machining location and pick it up again from there. The same advantages are thus apparent in this second embodiment of the invention as already cited above in the case of the first embodiment.

Moreover, precisely as in the case of the first embodiment of the invention described above, the position of first device 3b and the position of second device 4b are also determined with the help of a jointly used scale 12b.

What is claimed is:

1. The machine tool, comprising:
   a tool spindle;
   a tool changing device;
   a mechanical guide element for guiding a movement of the tool spindle and the tool changing device;
   a first drive apparatus for moving the tool spindle along the guide element; and
   a second drive apparatus for moving the tool changing device along the same guide element as the tool spindle to replace a tool attached to the tool spindle with another tool.

2. The machine tool of claim 1, wherein the first drive apparatus and the second drive apparatus are each embodied as a linear motor.

3. The machine tool of claim 1, wherein the first drive apparatus has a moveable primary part and the second drive apparatus has a moveable primary part, wherein both the primary part of the first drive apparatus and the primary part of the second apparatus interact with a common stationary secondary part as a reaction part.

4. The machine tool of claim 1, further comprising a common scale for jointly detecting a position of the tool spindle and the tool changing device.

* * * * *